TAPE READER, WITH PRINTER AND PERFORATOR

Filed June 20, 1962 9 Sheets-Sheet 1

INVENTOR.
BERNARD HOWARD
BY James and Franklin
ATTORNEYS

INVENTOR.
BERNARD HOWARD
BY James and Franklin
ATTORNEYS

INVENTOR.
BERNARD HOWARD
BY James and Franklin
ATTORNEYS

INVENTOR.
BERNARD HOWARD
BY James and Franklin
ATTORNEYS

June 7, 1966 B. HOWARD 3,255,312

TAPE READER, WITH PRINTER AND PERFORATOR

Filed June 20, 1962 9 Sheets-Sheet 5

INVENTOR.
BERNARD HOWARD

BY James and Franklin

ATTORNEYS

June 7, 1966 B. HOWARD 3,255,312

TAPE READER, WITH PRINTER AND PERFORATOR

Filed June 20, 1962 9 Sheets-Sheet 6

INVENTOR.
BERNARD HOWARD

BY James and Franklin

ATTORNEYS

INVENTOR.
BERNARD HOWARD

BY James and Franklin

ATTORNEYS

INVENTOR.
BERNARD HOWARD
BY James and Franklin
ATTORNEYS

INVENTOR.
BERNARD HOWARD
BY James and Franklin
ATTORNEYS

United States Patent Office 3,255,312

Patented June 7, 1966

3,255,312

TAPE READER, WITH PRINTER AND PERFORATOR

Bernard Howard, Upper Saddle River, N.J., assignor to Mite Corporation, New Haven, Conn., a corporation of Delaware Filed June 20, 1962, Ser. No. 203,778

23 Claims. (Cl. 178—17)

This invention relates to a tape printer, perforator and reader, particularly for accurate transmission.

The accuracy is obtained by preliminary display of a message, followed by regeneration of the message with correction of errors, and subsequent transmission of the corrected message. One object of the present invention is to generally improve the apparatus disclosed in my U.S. Patent 3,022,376, issued February 20, 1962, and entitled "Display Transmitter."

In the said patent a tape is ink printed with conventional characters and code dots. In the present improvement the code dots are made in the form of perforations rather than printed dots. The characters are exposed and made visible immediately following the perforator.

A compact and efficient telegraph printer which employs a pulley and cable system for selection of the type characters has been developed, and is disclosed in my prior Patent 2,942,065, issued June 21, 1960, and entitled "Telegraph Printer." One object of the present invention is to employ the multiple cam shaft and sequence shaft and special function mechanism of the said printer, thus making it easier to manufacture and service the new equipment, using much the same spare parts, which is of particular importance in military applications.

Another object of the invention is to adapt the same to accept any of several different tape widths. This again is of importance in military work because tape of one width may be available, but not another.

Still another object is to combine the present device with an associated page printer to locally print a copy of the outgoing messages for record purposes. The apparatus may function as an "ASR" or automatic-send-receive unit.

Conveniently accessible and easily operated switches are mounted at the front of the apparatus for providing any of a considerable number of combinations of operations. It is thus possible to perforate the tape from the keyboard; to perforate the tape from an incoming line; to machine read and regenerate or perforate; to machine read and transmit a single message or a continuous series of messages; to provide a page print copy if desired; to perforate from the keyboard and then machine read and transmit either with or without correction, as desired; and to perforate from an incoming line and then machine read and transmit, with or without correction, as desired.

Further features of the invention center about the details of the printer, the perforator, and the ink ribbon feed for the printer. These are not claimed herein, being disclosed in greater detail and claimed in my companion applications filed on June 20, 1962, under Serial Numbers 203,785 and 203,768, now Patent No. 3,184,027.

Further objects of the invention center about the machine reader, including also the manual marking of an error, and the machine detection of such error mark.

Another object is to provide both serial and parallel signals from the reader, which signals are isolated from each other so that one, the serial signal, may be sent out over a telegraph line or radio channel; and the other, a parallel signal, may be used locally, for example in a computer.

Still another object is to provide means in the reader for generating a local test signal. In accordance with preferred practice, this may be used to transmit "Letters" or "Blanks" or "R" and "Y" in alternation, which signals serve to test all of the perforating punches.

To accomplish the foregoing objects, and other objects which will hereinafter appear, the invention resides in the tape reader and associated elements and their relation one to another, as are hereinafter more particularly described in the following specification. The specification is accompanied by drawings in which.

Figures 4, 5:
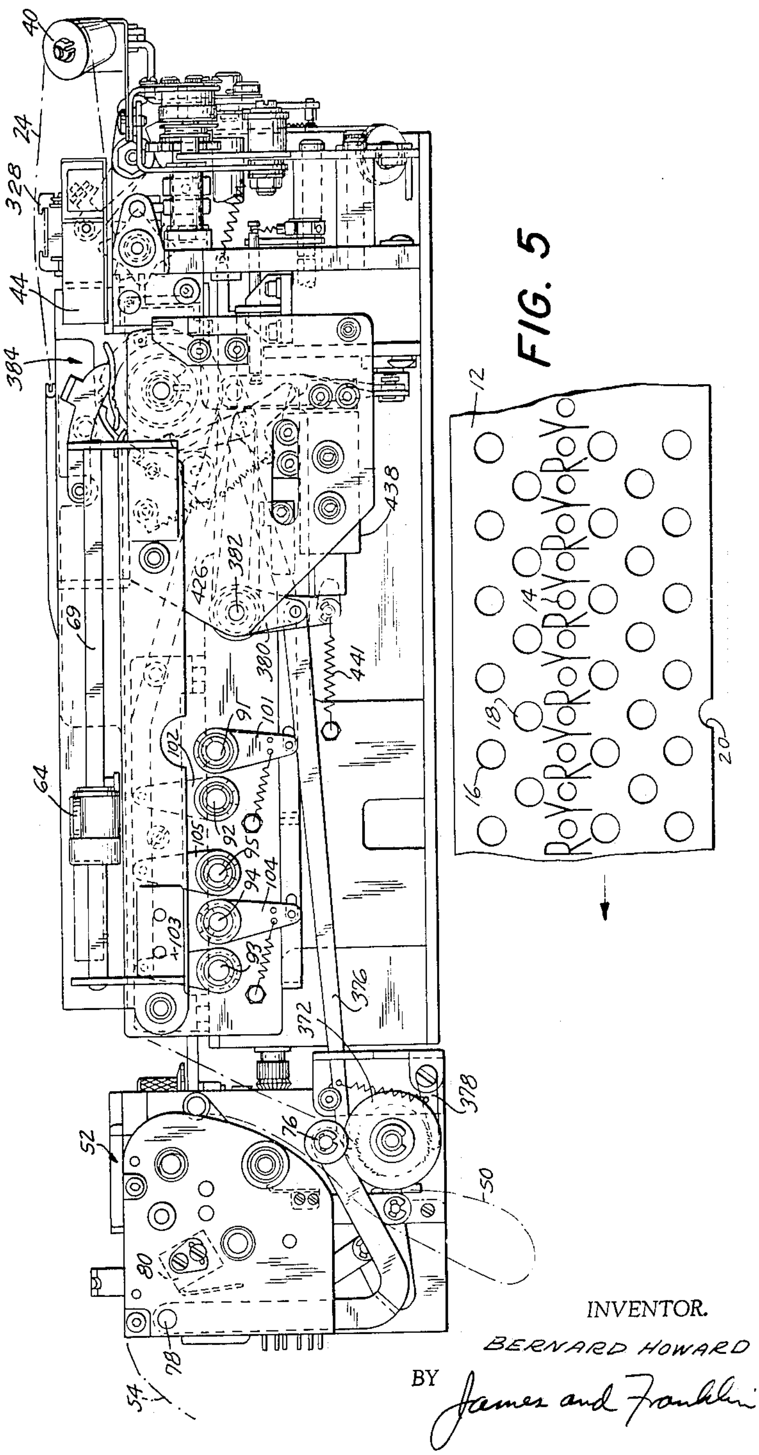
FIG. 4 is a front elevation of the mechanism shown in FIG. 3.
FIG. 5 shows a piece of perforated tape carrying the "R–Y" test pattern.

Referring to the drawing, and more particularly to FIG. 5, the tape 12 has a row of small perforations 14 which cooperate with a sprocket wheel for step-by-step feed of the tape. The printed conventional characters are printed between these perforations, as is here indicated by the letters R, Y, R, Y, etc. The present device uses a five-level or five-unit code, and the perforations for the letter Y are the three superposed perforations indicated at 16, while the perforations for the letter R are the two superposed perforations indicated at 18. The printed character necessarily is displaced from its own code perforations because of the physical displacement needed between the printing mechanism and the perforating mechanism. In the present machine this displacement is minimized and corresponds to the spacing of six-and-one-half letters. FIG. 5 also shows an error notch at 20.

Figures 1, 1A, 2:
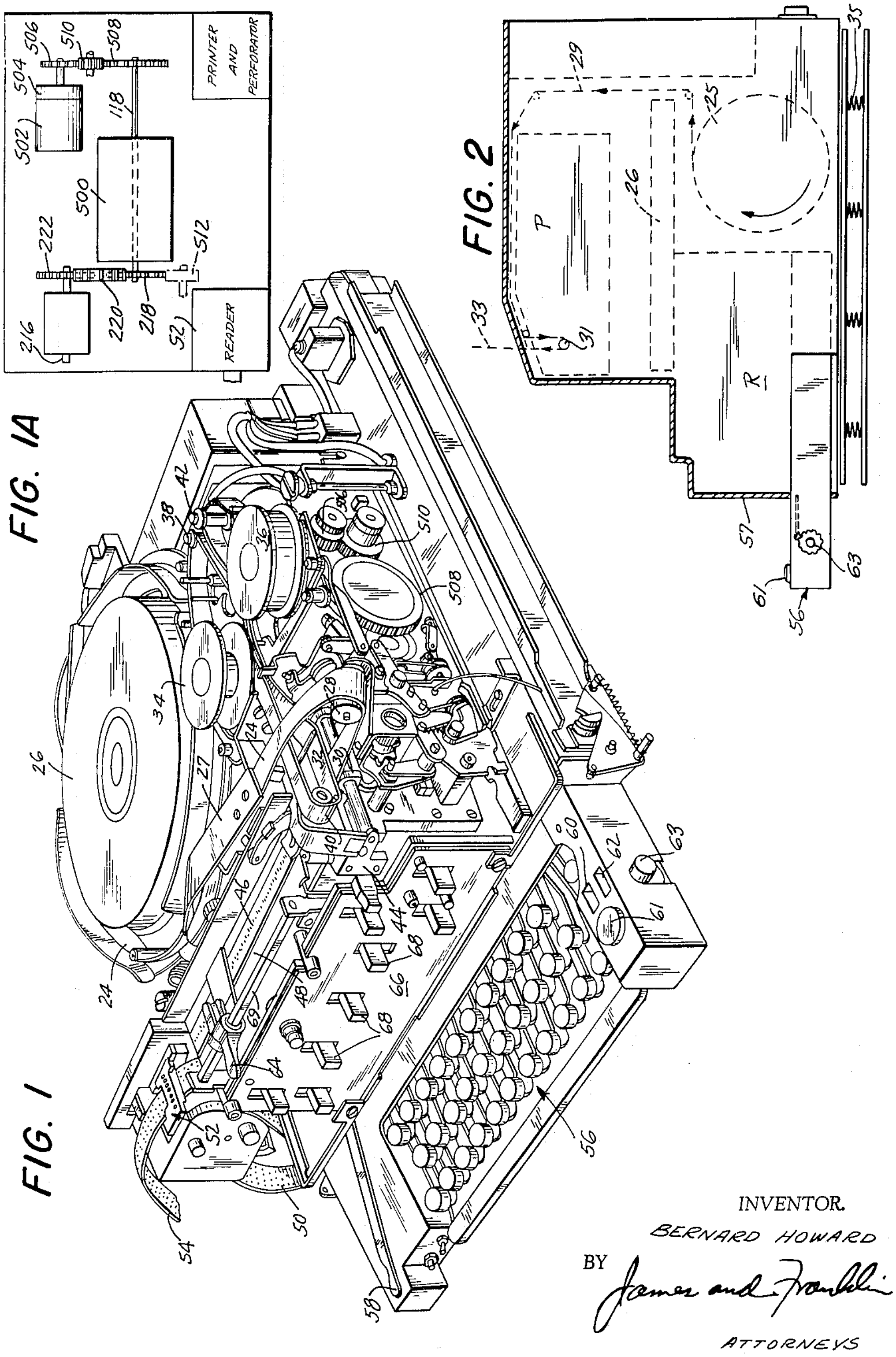
FIG. 1 is a perspective view showing a preferred form of tape printer, perforator and reader embodying features of the invention, the cover being removed.
FIG. 1A is a schematic plan view in block form.
FIG. 2 is a schematic transverse section, with a page printer combined over the tape machine.

Referring now to FIG. 1 of the drawing, a paper tape 24 is supplied from a large tape roll 26 disposed horizontally over the rear part of the apparatus. The tape is guided through a channel 27 and around an angularly disposed direction-changing idler 28 and thence over a type cylinder indicated at 30. The ink ribbon 32 extends transversely of the paper tape. The ink ribbon is supplied from a conventional typewriter spool 34, and is wound up on another conventional typewriter spool 36, or vice versa. The spools are turned by ratchet feed mechanism which is not conventional. The ink ribbon is guided around roller 38, thence far forward to a roller at 40, and then rearward to roller 42. A print hammer (not shown) is located between the forward and rearward passes of the ink ribbon and serves to strike the lower ribbon downward against the paper tape and the type cylinder 30 therebeneath.

The paper tape next passes through a perforator indicated generally at 44. A length of the printed and perforated tape then is displayed, as shown at 46, over a support or table 48. The tape then extends downward and reversely upward to provide a slack loop of tape, indicated at 50. After passing around a tight-tape sensing roller, the tape enters the tape reader, indicated at 52, where the code perforations are machine read. The tape leaves the machine at 54.

FIG. 1 also shows the manually operable keyboard, generally designated 56. This may be slid back beneath them in body of the apparatus, and for this purpose a release lever 58 is moved sideward to unlock the keyboard, thereby freeing it. FIG. 2 shows the forward position. In rearward position it is within the plane of wall 57.

The keyboard section preferably includes two counters, the digit wheels of which are visible at 60 and 62 (FIG. 1). One of these is a counter to indicate the number of characters transmitted before signalling carriage return. The counter then goes back to zero. This is important to an operator working with tape when transmitting to a station having a page print receiver, in order to help the operator break the message into lengths corresponding to single lines. The other window exposes digit wheels which may be preset by knob 63 to warn or signal the operator when a desired number of characters for a single line has been transmitted, the signal in this case being a lamp 61 which is lighted at the end of a line of desired length.

The switch panel 66 is provided with a considerable number of switches having handles 68 which may be moved to two positions. By appropriately operating these different switches in combination, the machine may be made to perform any one of a number of combinations of operations, as mentioned above.

After printing an exposed length of tape, the operator may read the same to discover an error. On discovering an error, an error marking device 64 may be slid along its guide rod 69 until its pointer reaches the error, whereupon the handle 64 is depressed. The device then functions to put an error perforation through one edge of the tape to notch the edge. With a wider tape it is a hole instead of a notch.

Subsequently if the machine is set for regeneration, the signal is reperforated and reprinted on the tape, without transmission to an outgoing line, and in such case the tape is automatically stopped when the error mark or notch is reached, thus affording the operator an opportunity to correct the error manually, whereupon the operation is resumed. The corrected length of tape is then displayed and examined, and if correct, may be transmitted on the outgoing line.

Figure 3:
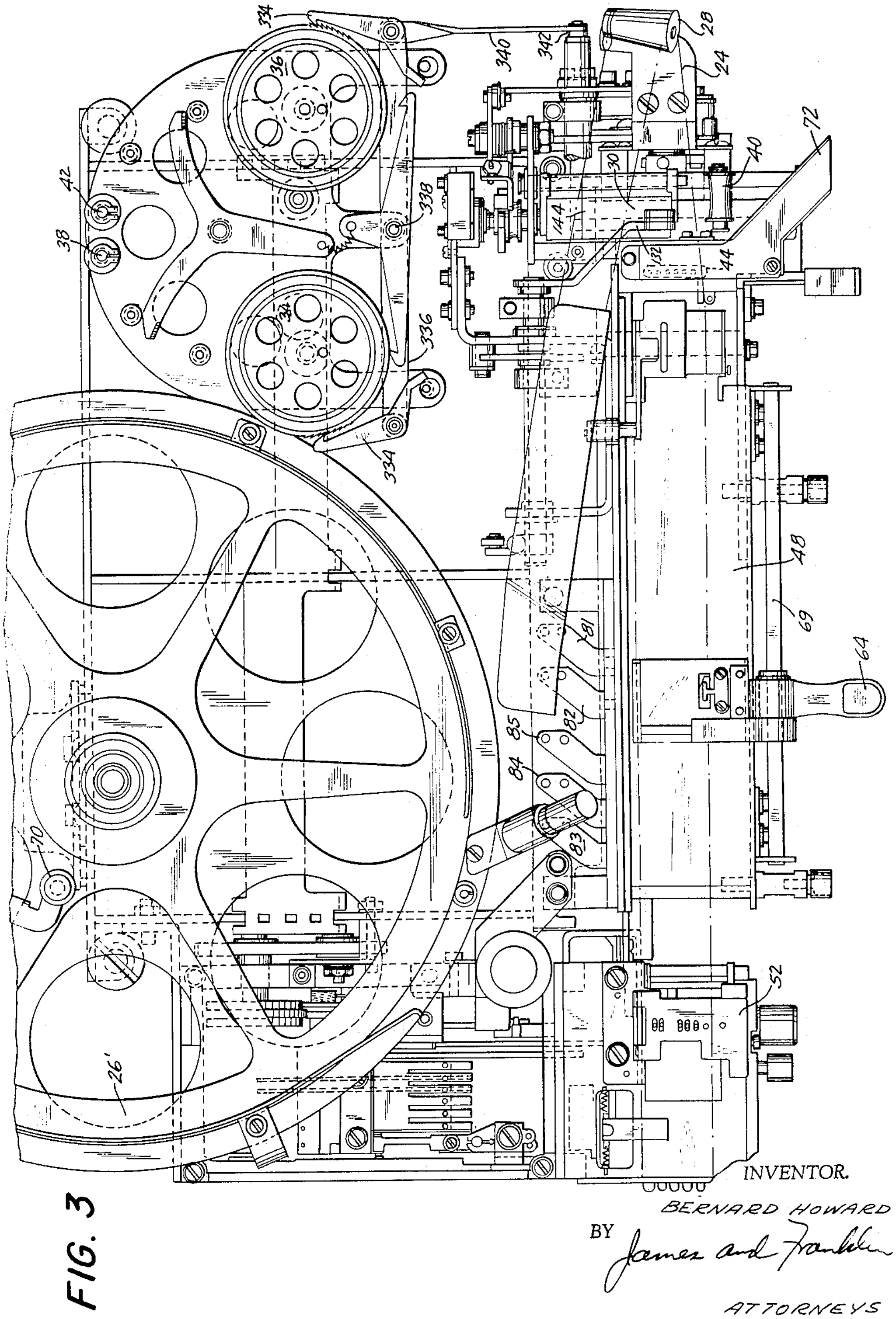
FIG. 3 is a plan view drawn to larger scale of a part of the mechanism shown in FIG. 1, without the keyboard and front switch panel.

Some of the foreging mechanism is shown to larger scale and in greater detail in FIGS. 3 and 4 of the drawing. Similar reference characters apply, except that in FIG. 3 the numeral 26′ refers to the support for the paper roll rather than the paper roll itself. One end of a low-tape sensor is indicated at 70, thus providing a signal when a new paper roll is needed. FIG. 3 also shows a chute 72 for the discharge of chad from the perforator 44. FIG. 4 shows the slack loop 50 employed ahead of the reader 52 and the tight-tape sensor 76 which is pivoted at 78 to operate a switch 80 in the event the slack loop is used up.

In Patent 2,942,065 a multiple cam shaft carries clutches and cams for selectively operating five cam follower arms which carry pulleys which operate on cables for axial and rotary selection of a type character on a cylindrical type body. (A sixth pulley is operated as a special function.) Similar mechanism is employed here, but in addition each arm operates not only a pulley, but also an angle lever for control of an appropriate perforator punch. The five angle levers here referred to are indicated at 81–85 in FIG. 3. These angle levers oscillate five shafts indicated in FIG. 4 at 91–95. These shafts in turn oscillate five arms indicated at 101–105. The ends of these arms are connected to long bars which extend generally horizontally to the perforator 44, where they act as selector interposers to make one or more of the punches operative.

Figure 6:
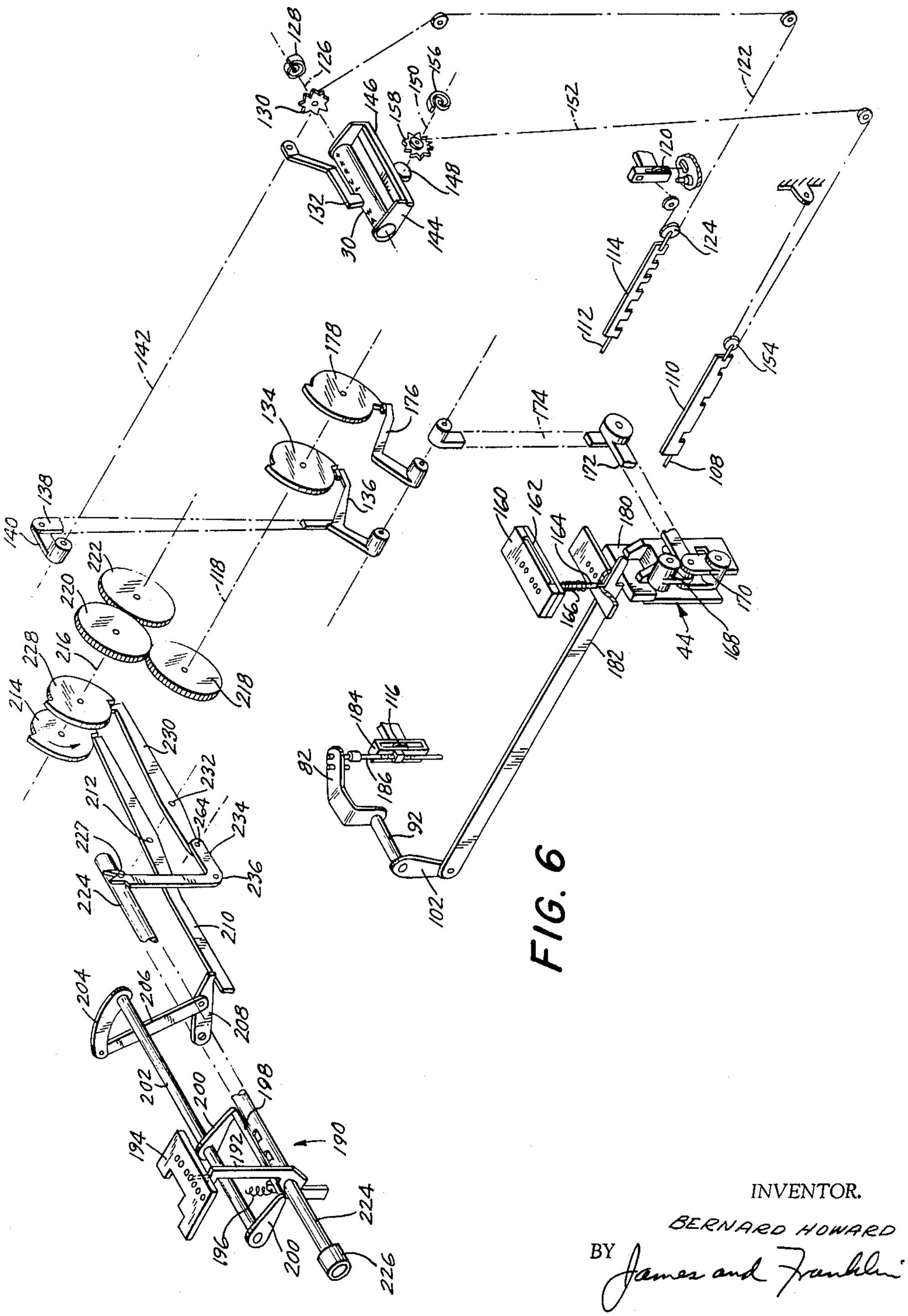
FIG. 6 is an exploded schematic perspective view explanatory of some of the parts of the mechanism shown in the preceding figures.

Reference now may be made to FIG. 6. The cable end 108 and notched slide 110 correspond in the aforesaid Patent 2,942,065 to the pulley-operated selector cable numbered 42 there and function slide 38 there. This provides axial movement of the type cylinder. The parts numbered 112 and 114 correspond to the pulley operated selector cable 108 of that patent and function slide 106 there. A vertically movable pulley indicated at 116 is typical of five such pulleys moved by cam follower arms, the cams and cam clutches of which are mounted on a motor driven shaft suggested at 118. Three pulleys like the pulley 116 operate on cable 108, and one has a motion double that of another, thus providing eight positions of the type cylinder in axial direction. Two pulleys like the pulley 116 operate on the cable 112, providing an eighth and also a quarter rotation of the type cylinder, and a third pulley is indicated at 120, this corresponding to a half rotation of the type cylinder. This causes a change from letters to figures, which change may be provided as one of a number of so-called "special functions" controlled by the relative positioning of the notched slides 110 and 114, all as is explained in Patent 2,942,065.

A cable 122 is coupled to slide 114 by pulley 124, and also is operated on by selector pulley 120. The cable 122 is wound about and turns a splined shaft or keyed shaft suggested at 126, and serves to turn that shaft and consequently the type cylinder 30. The cable works against a restoring spring 128. The shaft preferably carries a detent wheel 130 which helps fix the position of the type cylinder at the instant of printing.

The print hammer is indicated at 132 and is operated by mechanism schematically represented as follows: There is a cam 134 and associated clutch (not shown) on shaft 118. The cam operates a cam follower arm 136, which in turn is connected through a link 138 to an arm 140 which turns a shaft 142, which in turn operates the hammer 132 when the cam drop is reached. The actual mechanism is more complex and is described later.

The type cylinder 30 is moved axially by a yoke 144 carrying a gear rack 146 meshing with a gear 148 on a shaft 150. This is turned by a cable 152 which is connected to the notched slide 110 by a coupling pulley 154. The cable works against a restoring spring 156. In Patent 2,942,065 the cable 152 is connected directly to the yoke 144 to provide axial movement, but in the present mechanism the interposition of a rotatable gear 148 and gear rack 146 has the advantage of facilitating the use of a rotary detent wheel 158 which helps fix or center the position of the characters when the type cylinder 30 is moved axially. This isolates the type cylinder from the vibration of the detent mechanism. In this schematic diagram the paper tape and ink ribbon have been omitted.

The perforator is indicated at 44. Its stationary die is shown at 160, the paper tape passing through a tape slot 162. There is a line of punches, only one of which is indicated at 164. It is normally retracted by a compression spring 166.

The punches are moved upward by a toggle mechanism, the toggle arms of which are shown at 168, 170. The toggle arms are moved by a link 172 connected to an arm 174 operated by a cam follower 176 driven by a cam 178. This cam again has a clutch, and both cam and clutch are mounted on shaft 118. The toggle mechanism causes vertical movement of a shuttle interposer 180, the purpose of which is explained later.

The shuttle 180 underlies and attempts to operate all of the punches. However, it does not do so unless the large end of a selector interposer 182 is moved between the shuttle 180 and the lower end of the punch 164. It will be recalled that there are five vertically movable pulleys 116 which operate on the two cables, and that these also operate five angle levers. One example is shown in FIG. 6, the pulley block 184 carrying a threaded adjustable pin 186 bearing against the end of angle arm 82. This is connected to pivot 92 carrying arm 102 connected to selector interposer 182. There are five such mechanisms which selectively make one or more of the five main punches operable. There is a sixth additional punch of smaller diameter which operates at every stroke in order to provide uniformly spaced feed or sprocket holes for subsequent use.

The tape reader is indicated generally at 190. It comprises a row of vertically movable sensors, only one of which is indicated at 192. Its upper end carries a pin slidable through one of the holes in a tape guide 194, which encloses the tape in order to support the same. There are seven holes, five of which are for the code perforations. The remaining two holes at the left are for error indication, one being used when the tape is narrow, and the other when the tape is wide, if edge notches are wanted rather than perforations. The sensors are urged upward by individual small pull springs 196. They are held in down position by a retractor rod 198 carried on arms 200 rocked by a shaft 202. This is rocked by an arm 204 and link 206 connected to an arm 208 controlled by a lever 210 pivoted at 212 and operated by a cam 214. This cam and its clutch are mounted on a shaft 216 geared to main shaft 118 by means of gears 218, 220 and 222.

The tape reader additionally employs sprocket feed mechanism, not here shown, and the timing of the parts is such that when the tape dwells with its perforations in registration, the cam 214 permits the right end of lever 210 to rise, whereupon the left end and the arm 208 fall, thereby causing arms 200 to rise, and permitting the sensors to rise where there is a tape perforation.

The rise of the sensors is also controlled by a slotted rod 224 which may be turned to any of four positions by a control knob 226. One of these positions is used to transmit an RY test signal, for which purpose the rod 224 is reciprocated axially. This is accomplished by a cam 228 on shaft 216, the said cam operating a lever 230 pivoted at 232 and connected to an angle lever 234 pivoted at 236. The upper end of the angle lever has an open fork connected to rod 224 at a pin 227, when rod 224 is in the RY position.

Referring to FIG. 1–A, the box 500 represents the selector of Patent 2,942,065 and has its main cam shaft 118 continuously driven by a motor 502 with built in reduction gearing at 504, connected to shaft 118 through a pinion 506 and a gear 508 with an idler 510 therebetween. Motor 502 is a synchronous motor, and pinion 506 may be removed and replaced to provide operating speeds of 60, 66, 75 and 100 words per minute. The change in diameter of pinion 506 is accommodated by moving the center position of idler 510. These gears are also shown in FIG. 1.

Main shaft 118 is geared to the cam shaft 216 of the reader 52 by means of gears 218, 220, and 222. The printer perforator is driven from the special function shaft (not shown) of the selector 500. The keyboard shown in FIG. 1 but not FIG. 1A also has a cam shaft, as is fully described in my Patent 2,977,413 issued March 28, 1961. The said shaft is driven from the gear 218, and for this purpose the keyboard has a gear 512 which moves into mesh beneath gear 218 when the keyboard is pulled to its forward or operating position. Gear 512 is disengaged from gear 218 when the keyboard is slid back to inoperative position.

Referring to FIG. 2 of the drawing, the printer, perforator and reader mechanism is housed in the area marked R. The keyboard 56 may be pulled out, as shown, but when pushed rearward it is located beneath the region R. The narrow tape roll is located at 26. When a page printer is provided it is preferably located above the tape roll 26, as indicated at P. It is supplied with wide paper from a paper roll 25, the paper being fed upward, as indicated at 29, and then forward over the top of the page printer P, and thence downward and around a direction-reversing roller 31, and thence upward out of the machine at 33. The paper is printed on its way up from the roller 31. The page printer P may be the same as that disclosed in Patent 2,942,065, previously mentioned. The entire assembly may be mounted on shock mounts, as suggested at 35.

*The tape reader and signal generator*

Figures 7, 8, 8A:
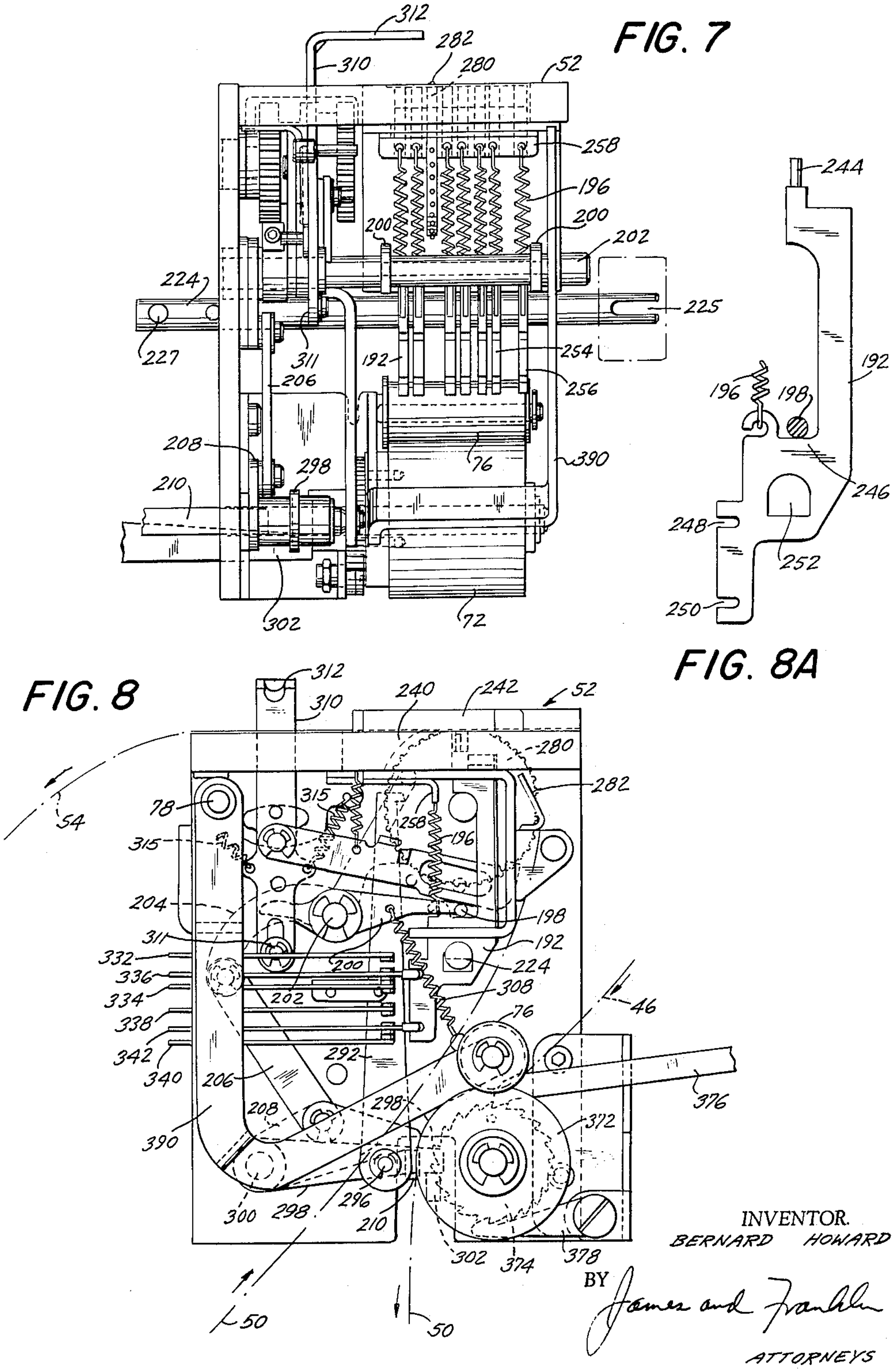
FIG. 7 is an elevation of the reader, looking from the left of FIG. 8, but with the electrical contacts omitted.
FIG. 8 is a front elevation of the reader, with the front plate removed.
FIG. 8A shows one of the sensor plates.

The tape reader is next described in greater detail. Referring first to FIG. 8 of the drawing, the tape 46 is formed into a slack loop 50 and is then fed through a tape slot formed between a lower plate 240 and an upper plate 242, the tape being discharged at 54. The presence or absence of a perforation is sensed by a sensor plate or pin, and one of these plates is shown in FIG. 8A, it comprises a plate 192 terminating in a pin 244. The plate is urged upward by a pull spring 196. It has a bearing surface 246 against which a rod 198 may bear downward to retract all of the sensor pins from the tape. It has notches 248 and 250 to operate electrical contacts, as is later described. It has an opening 252 to receive a control rod which also is described later.

Figures 9, 10, 11, 12:
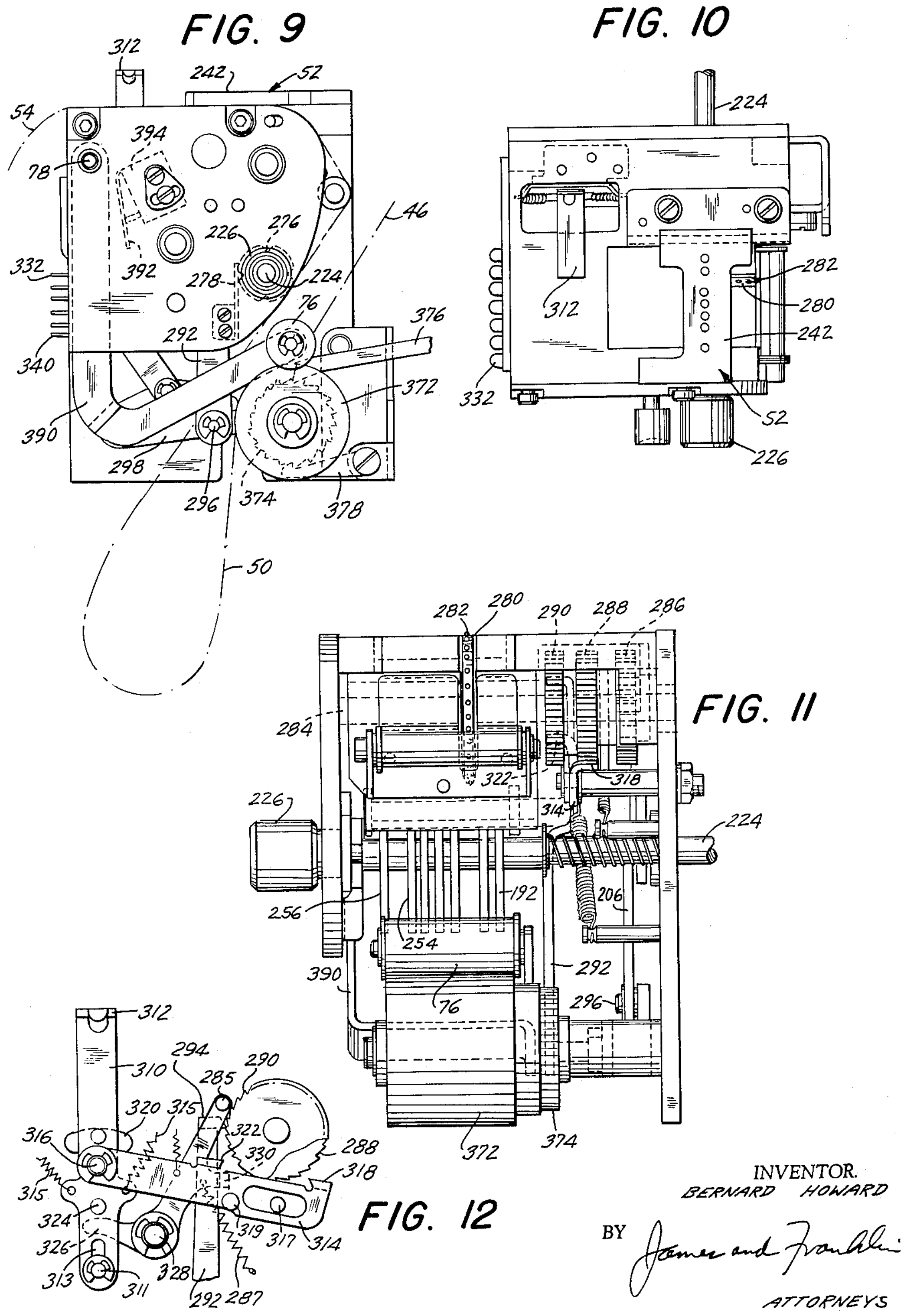
FIG. 9 is a front elevation of the reader.
FIG. 10 is a plan view of the same.
FIG. 11 is a side elevation looking toward the right of FIG. 8.
FIG. 12 shows some of the linkage viewed in the same direction as in FIG. 8.

Referring now to FIGS. 7 and 11, the reader comprises a row of closely adjacent sensor plates 192. In the present case there are five such plates corresponding to the five perforations for a five-level or five-unit code. The sprocket holes are occupied by the sprockets 282 of a feed mechanism. There are two additional plates marked 254 and 256 which are used to sense the presence of an error notch or perforation, the sensor 254 being used when dealing with a narrow tape, and the sensor 256 being used when dealing with a wider tape, if edge notches are preferred.

Referring now to FIG. 7, there are as many pull springs 196 as there are plates. The lower end of each pull spring is connected to the hook of its plate, and the upper end is connected to a fixed support 258.

At the end of each sensing operation all of the plates are pulled down to make sure that the tape is free for its next feed movement. For this purpose rod 198 extends over the bearing surfaces of the plates, this rod being carried by arms 200 pivoted at 202.

Figures 13, 14:
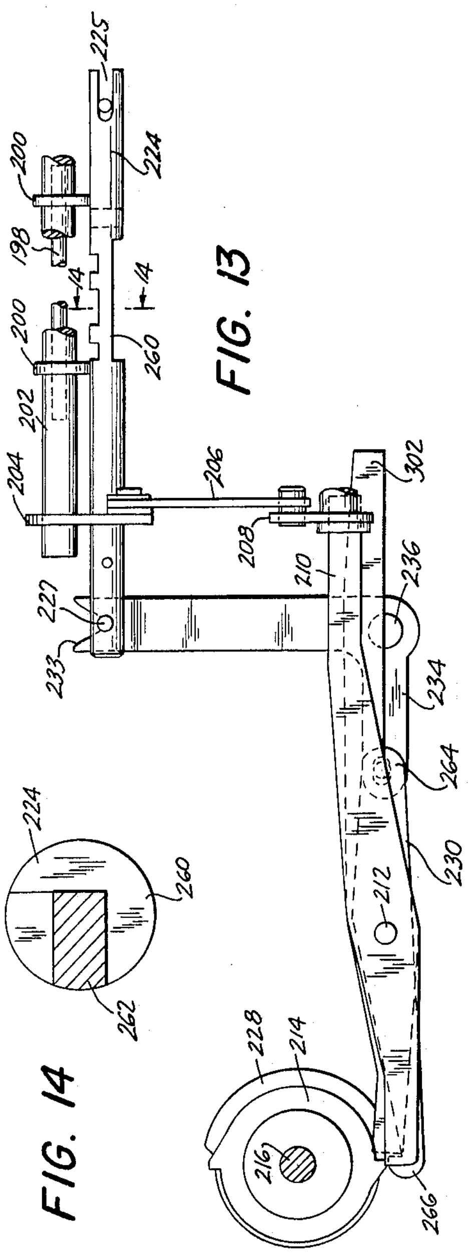
FIG. 13 is explanatory of the mechanism for driving the reader, viewed in the same direction as in FIG. 7.
FIG. 14 is a fragmentary section, drawn to enlarged scale, taken in the plane of the line 14—14 of FIG. 13.
Figure 15:
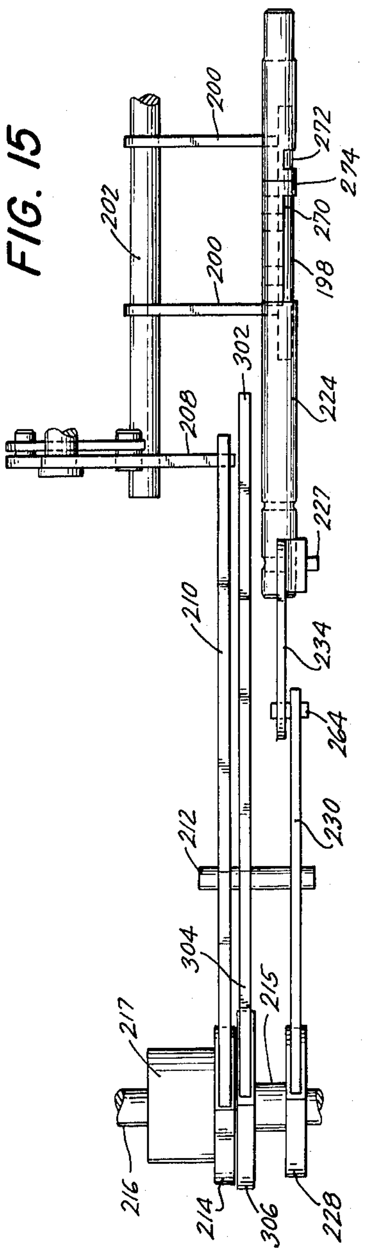
FIG. 15 is a plan view of the mechanism shown in FIG. 13.

Referring to FIGS. 13 and 15, the rod 198 and arms 200 are rocked by shaft 202, which in turn carries arm 204 oscillated by the generally upright link 206 connected at its lower end to arm 208, which is actuated by a lever 210 pivoted at 212. The other end of lever 210 acts as a cam follower cooperating with a cam 214. This is turned by a sleeve 215 through an immediately adjacent half revolution clutch 217, which may be the same as those described in the aforesaid Patent 2,942,065, and which connects the sleeve 215 and all three cams to a shaft 216. This linkage is also shown in perspective in FIG. 6, but without the clutch and sleeve.

In connection with FIG. 8A, it was mentioned that the sensor plates have aligned holes 252. A rod 224 (FIGS. 7, 13 and 15) passes through these holes and serves to control the sensor plates. The rod is rotatable, as by means of the knob 226 shown in FIGS. 10 and 11. FIG. 7 shows a slotted end 225 which receives the knob. The rod 224 is also axially movable, and for this purpose has a pin 227 which may be received in the bifurcated upper end 233 (FIG. 13) of an angle lever 234 which is pivoted at 236.

The rod 224 is so shaped that in one rotative position it permits all of the plates to move; in another rotative position it blocks all of the plates against movement; and in a third rotative position it is connected for axial reciprocation and alternately blocks plates 1, 3 and 5, or plates 2 and 4, thereby transmitting an RY test signal.

Referring to FIG. 13, when the rod 224 is in the position shown, the relatively long continuous cut away portion 260 is disposed over the bottom of the holes 252 in the sensor plates, and thus the five sensor plates may rise, and also the error sensor for the narrow tape.

A section through the rod 224 is shown in FIG. 14, and it will be seen that at the part 262 the rod is maintained at full radius. If then the rod 224 is turned ninety degrees in counterclockwise direction, the uncut portion 262 faces downward and prevents the rise of any of the sensor plates.

If the rod 224 is turned another ninety degrees, or one hundred eighty degrees from the position shown in FIG. 13, the notched portion shown at the top in FIG. 13 then is at the bottom. The steps or slots are so located that when the rod is in one axial position it blocks sensors 1, 3 and 5 and permits movement of sensors 2 and 4. In its other axial position it blocks sensors 2 and 4 and permits movement of sensors 1, 3 and 5. If then the rod 224 is reciprocated between these two positions, in the absence of tape, the response of the sensors will generate the test signal RY.

The mechanism for reciprocating the rod 224 may be described with reference to FIGS. 13 and 15. The rear end of rod 224 has a pin 227 which projects toward the observer in the position shown in FIG. 13. For RY transmission the rod is turned one hundred eighty degrees, at which time the pin 227 enters the bifurcation 233 at the upper end of angle lever 234. The lower arm of the angle lever is pivoted at 264 to lever 230. The other end of lever 230 acts as a cam follower 266 cooperating with a cam 228 which is turned by the sleeve 215. This is clutched, for half revolutions, but operates substantially continuously because one character follows right after another.

The perforation of an RY test signal is illustrated in FIG. 5, the two holes at 18 corresponding to R, and the three holes at 16 corresponding to Y.

If the control rod 224 (FIG. 15) is turned another ninety degrees it comes into a position as though FIG. 15 were an elevation instead of a plan view. At this time there is a long cut away at 270 which affords upward movement of all five code sensors. There is also a separate or spaced cut away at 272 which permits the error sensor for a wide tape to rise. Between the parts 270 and 272 the rod is left intact at 274, where it prevents upward movement of the error sensor for the narrow tape.

Thus there are four rotative positions for the rod 224, one of which is used for normal tape reading of a narrow tape, and another for normal tape reading of a wide tape. For test purposes either of these positions may be used for the transmission of a full set of dots. A third position restrains all sensors, and would correspond to the test transmission of blanks. The fourth position is accompanied by axial reciprocation and generates a test transmission of RY. Signal generation for test purposes is done without tape in the reader.

The four rotative positions of shaft 224 are located and held by appropriate detent mechanism. This is illustrated in FIG. 9 in which a detent 276 cooperates with a resilient detent arm 278, there being four detent recesses on the detent wheel 276, with the recesses ninety degrees apart. When not transmitting the RY test signal the axial position of notched rod 224 is determined by a compression spring around the rod as shown in FIG. 11. The detent wheel affords axial movement without loss of its detent action.

*Tape feed*

Referring to FIGS. 8 and 11, the tape is fed intermittently by means of a feed wheel 280 having sprocket pins 282 properly spaced to enter the feed holes of the tape. The wheel 280 is narrow because it must fit between the sensor plates on either side. It is turned by a shaft 284 (FIG. 11) which extends to one side of the reader where it carries a detent wheel 286, a forward feed ratchet wheel 290, and a reverse ratchet wheel 288, which is described later. The ratchet wheel 290 is operated by a generally upright feed pawl shown at 292 in FIGS. 8 and 12, it having an offset tooth at 294 (FIG. 12) to engage the teeth of ratchet wheel 290, for forward tape feed. Referring to FIG. 8, the lower end of pawl 292 is connected at 296 to an arm 298 pivoted at 300. The free end of arm 298 is operated by the forward end of a relatively long feed lever 302 which extends rearwardly. Referring now to FIGS. 13 and 15, the feed lever 302 is pivoted at 212 and its opposite end 304 cooperates with a feed cam 306 driven by sleeve 215 which turns a half revolution at a time for each character, by reason of a clutch 217 and continuously rotating shaft 216.

Reverting to FIG. 8, the feed pawl 292 is urged into engagement with the ratchet wheel, and also is pulled downward for feed movement, by means of a sloping pull spring.

The detent wheel 286 (FIG. 11) cooperates with a detent roller 285 (FIG. 12) urged toward the wheel by a spring 287. It simply cams against the sloping triangular teeth of the detent wheel.

*Manual tape movement*

A displayed message with error marks may be machine read and regenerated up to an error mark, whereupon the error is corrected manually by means of the keyboard, and then the regeneration is resumed. This alone would take care of an erroneous character, but would not suffice in the event the error involves the omission of a character or the insertion of an extra character, because in such case there would be a loss of synchronism as between the reader, on the one hand, and the printer perforator responding thereto, on the other hand. To take care of this the reader is provided with a manually operable means affording either back spacing or forward spacing. Such means is also useful when starting a message, in order to start on the desired first letter.

Referring to FIG. 11, a second ratchet wheel 288 has teeth which face in opposite direction compared to those of wheel 290, and is used for back spacing.

Referring to FIGS. 7 and 8, a generally upright arm 310 has a handle 312 and may be moved to the right or left about pivot 311 as viewed in FIG. 8. Referring now to FIG. 12, when handle 312 is moved to the left it pulls a pawl 314 to the left, the parts being connected at 316. The pawl is guided by a pin and slot at 317. A ratchet tooth 318 engages the reverse ratchet wheel (288 in FIG. 11) and so backspaces the tape. The travel is limited by a slot 320 and corresponds to one character. The pawl 292 does not interfere because it is moved to the left by a stud 319 on pawl 314.

To forward space the tape, the handle 312 is moved to the right. This again moves the pawl 314, which is provided at an intermediate point with another tooth 322 for cooperation with the forward ratchet wheel (290 in FIG. 11). As shown in solid and broken lines in FIG. 11, the pawl teeth 318 and 322 are bent on opposite sides of the pawl 314, the latter being located between the ratchet wheels 288 and 290. During this forward spacing movement the back-space tooth 318 is moved away from its ratchet wheel.

The same handle 312 also may be used to provide a free tape, that is, to release the tape so that it may be pulled manually through the reader. This is accomplished by moving the arm 310 in longitudinal direction, that is, by pressing it downward. This is permitted by a slot 313 at pivot 311. Referring to FIG. 12, when handle 312 is pressed downward, against the springs 315, the pin 324 bears against the arm 326 of an angle lever pivoted at 328. The angle lever has an offset at 330 which bears against the feed pawl 292 and moves it to the left so that it is out of engagement with its ratchet wheel 286. The pawls 318 and 322 are normally out of engagement when handle 312 is in midposition, and thus the tape is free to be drawn through the reader. The springs 315 normally center the handle 312, as well as raise it.

It may be noted that the detent roller 285 is carried on on upward extension of the same angle lever that serves to disengage the feed pawl and therefore it also is disengaged for free tape pull.

*Double circuitry*

Referring to FIG. 8, there are two superposed sets of electrically insulated contacts for each sensor plate 192. The upper set comprises stationary contacts 332 and 334, with a movable contact 336 therebetween. The free end of the movable contact is insulated and projects into the upper notch (248 in FIG. 8A) of the plate. The lower set comprises stationary contacts 338 and 340 (FIG. 8) with a movable contact 342 therebetween, and the free end of contact 342 is insulated and received in the lower notch (250 in FIG. 8A). Each set of contacts is equivalent to a single-pole double-throw switch. If a single-pole single-throw switch is adequate, one of the stationary contacts is not used.

In either event, two independent circuits may be controlled, and this is of great value in the present apparatus because the reader may be used to transmit serial code pulses on a telegraph line or radio channel, and at the same time to transmit parallel code pulses to actuate local apparatus such as a computer. With local apparatus multiple conductors may be run to the apparatus, thereby simplifying such apparatus by eliminating the need for the storage of the serial pulses needed for each character.

There are five sets of contacts like those shown in FIG. 8, one set for each of the five sensor plates. There are two additional sets of contacts for the two error-sensing plates. For convenience of manufacture all may be made alike. The outer ends or soldering terminals of the seven sets are shown in FIG. 10 at 332. All contacts may be molded into one insulation body to hold the same.

*The error notcher*

Figure 16:
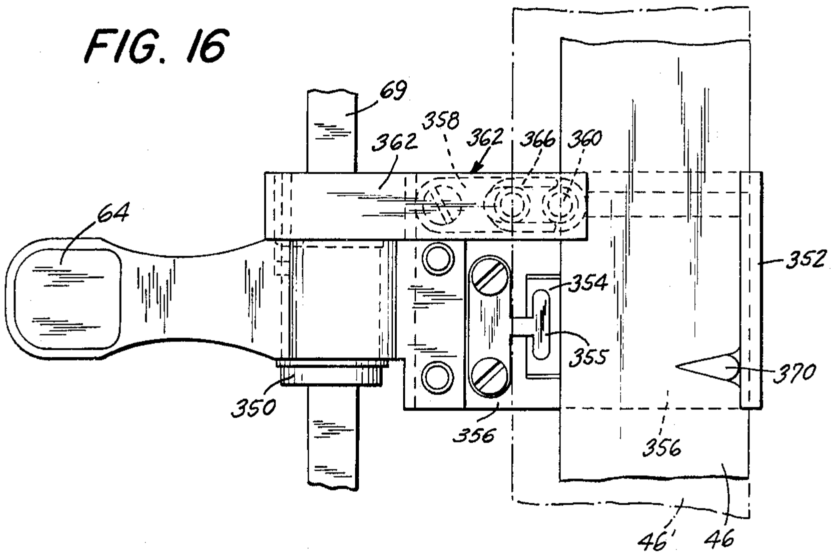
FIG. 16 is a plan view of the error marker, drawn to enlarged scale.
Figure 17:
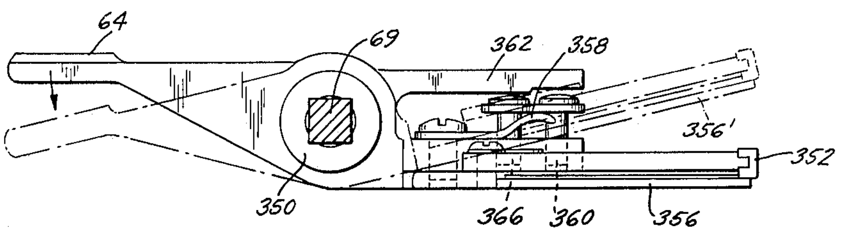
FIG. 17 is an elevation thereof.

Referring to FIG. 1, an error marking device 64 is slidable on a rod 69 and along the displayed tape in order to mark the location of an error. Referring now to FIGS. 16 and 17, the hub portion 350 is freely slidable along a square rod 69 which extends parallel to the displayed tape 46. The tape is received between a guide slot 352 at one edge and a guide block 354 at the other edge. These are mounted over a relatively thin bottom plate 356 which underlies the tape. These parts are all connected to an operating handle 64 which may be turned about the hub portion 350, as shown by the change from the solid line position 356 (FIG. 17) to the broken line position 356'. This movement is against the resistance of a leaf spring 358. This is slotted to straddle the punch 360 (and another punch 366).

The head of punch 360 is disposed above spring 358 and beneath a stationary arm 362 which is formed integrally with, or in any case is fixedly related to the hub portion 350. Thus the stationary arm 362 prevents upward movement of punch 360 and consequently the paper tape is moved against the punch. The base 356 is apertured to mate with the punch, and acts as a die.

Figure 18:
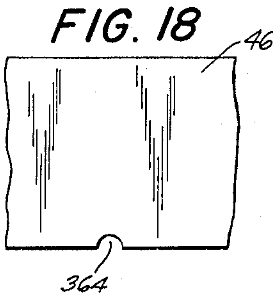
FIG. 18 shows an error notch in a narrow tape.

Referring to FIG. 18, the punch preferably is located astride the edge of the tape so as to form a half rather than a full hole, as indicated at 364. This is done because the tape may be used, or stored and later used, with a reader differing from the present one. Some such readers employ an edge notch sensor for error detection. The notch 364 may be used with an edge sensor, as well as with the pin sensor here illustrated. For the latter alone a complete hole could be provided instead of a notch.

Figure 19:
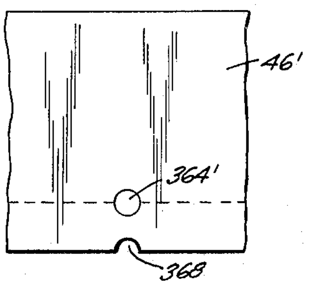
FIG. 19 shows an error notch in a wide tape.

Reverting to FIG. 17, there is another punch 366 which serves to notch the edge of a wider tape. This is shown in FIG. 19 in which the wider tape 46' is given an edge notch at 368, and incidentally is perforated at 364'. The perforation 364' does no harm because the reader, when working with the wide tape, has its inner sensor disabled, and only the outer sensor is operative. In the particular case here shown the narrow tape has a width of $^{11}/_{16}$ inch and the wide tape a width of ⅞ inch, but other widths may be designed for.

Referring now to FIG. 16, when working with the wide tape 46', instead of the narrow tape 46, the guide shoe 354 is removed. It is held by a small leaf spring 355. The error marker has a pointer indicated at 370 (FIG. 16). This is moved to the location of the wrong character which is to be corrected. The punches 360 and 366 are located beneath the fixed arm 362. The spacing lengthwise of the tape, between the punches and the pointer 370, corresponds to the spacing between the printer and the perforator, which is six and one-half spaces in the present case. Thus the error notch is aligned with the code perforations, rather than the printed character, which is as it should be.

*Tight tape stop*

Referring to FIG. 9, the tape 46 leading into the slack loop 50 is fed by a friction feed roller 372. The tape is pressed against roller 372 by a roller 76. The feed roller 372 is turned by a ratchet wheel 374, and referring also to FIG. 8, the ratchet wheel is operated by a pawl 376 extending toward the right. A check pawl 378 also may be provided.

Referring now to FIG. 4, the feed pawl 376 extends to an arm 380 pivoted at 382 and operated by linkage connected to the feed means generally designated 384, located at and forming a part of the printer perforator. More specifically arm 380 turns like an angle lever with a generally horizontal arm 426, the right end of which carries a pawl engaging a ratchet wheel for turning a sprocket feed wheel which feeds the tape. The details are given in my copending companion application Ser. No. 203,785, referred to above. Both feeds at 384 and 372 operate in synchronism for the same distance in the same direction.

Reverting to FIG. 8, the reader has its own positive feed means which includes sprocket wheel 280 and is operated in synchronism with the reader. Thus, in the complete apparatus there is a tape feed means 384 (FIG. 4) at the printer perforator, operated in synchronism with the printer perforator, a feed means 280 at the reader operated in synchronism with the reader, and an additional feed means 372 which is located at the reader, but operated by linkage extending all the way back to the printer perforator for operation in synchronism with the latter. A slack loop 50 of tape then may be provided just ahead of the reader, and if the message is being sent in short lengths after correction and regeneration, the loop is long enough to permit transmission of the corrected message, with no accompanying movement at the printer perforator, although in many, or perhaps most cases a proof copy may be wanted, in which case the tape is moved at both ends and the slack loop is maintained.

With the message being sent in short lengths, or in the event of an accident, whereby the feed at the reader continues without a corresponding supply of tape from the printer perforator, the slack loop is taken up. The roller 76 then serves a dual function, it being located within the slack loop, so that when the slack loop has been taken up, the roller 76 rises. It is carried by an arm 390 pivoted at 78, and referring to FIG. 9, when arm 390 moves to the right it bears against the movable part 392 of a microswitch 394 which disables and interrupts the operation of the sprocket wheel 280 of the reader. It does this by opening the electrical clutch release circuit of the transmitter, and so stops the transmission and the feed.

*Modification*

Figure 20:
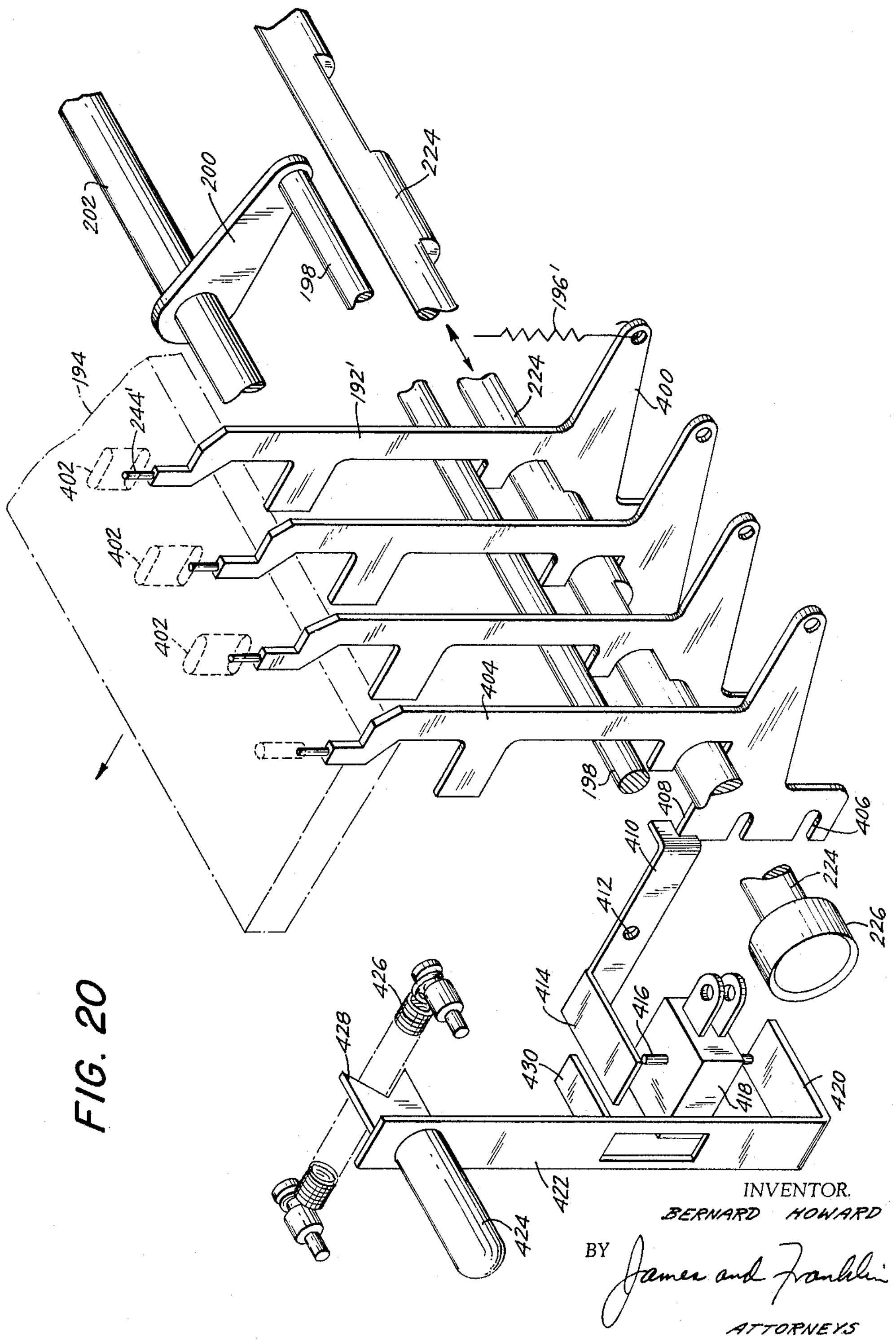
FIG. 20 is a perspective schematic view explanatory of the automatic stop switch and other features.

Some minor modifications in the reader may be described with reference to FIG. 20 of the drawing. The notched control bar 224, the retraction rod 198, its arms 200 (only one shown), and their rock shaft 202, all correspond to the similar parts previously described. In the present case the pull strings which urge the sensor plates upward, are differently located, and connect to arms 400, one pull spring being marked 196'. The holes for the sensor pins 244' are slots 402, which have the advantage over round holes of being able to handle chadless tape as well as perforated tape, should such tape happen to be supplied to the reader. Although only three of the character reading plates are shown, there are five, as before.

Another difference is that only a single error sensing plate 404 is provided, instead of two as before. When a narrow tape is used it receives an edge notch as before, but when a wide tape is used it receives a perforation. Thus in FIG. 19 there would be only the perforation at 364', and no notch at 368. Consistent with this, the error marker has only one error punch, this being the punch 360 (FIGS. 16 and 17). The punch 366 is omitted. This also makes possible the use of more than two widths of tape, and in this modification tape widths of 11/16 inch, 7/8 inch, and one inch are accommodated. If a removable guide block is used in the error marker, as shown at 354 in FIG. 16, two such blocks may be provided for three tape widths.

In any case, including the reader of FIGS. 7–12, no removable guide blocks or other such guide means are needed at the reader because the reader employs a sprocket feed wheel, combined with a single guide at the top or inner edge of the tape, and these alone suffice for guiding the multiple width tapes.

The error sensor plate 404 has notches 406, but only so that all plates may be alike, and the notches 406 are not used to operate switch contacts. Instead, the upper edge 408 bears against a lever 410 pivoted at 412 and having a sideward extension 414 which overlies the operating pin 416 of an over-the-center microswitch 418. This switch also serves as the main power switch of the reader, and the lower end of pin 416 may be pushed upward by an arm 420 on a vertically movable bar 422 having a manually operable switch handle or button 424. This is raised for "on," and lowered for "off." The handle 424 is normally centered by a taut pull spring 426 received in a notch 428. An arm 430 overlies the arm 414 and pin 416. By moving the handle or button 424 momentarily upward, the reader is started, and by moving it momentarily downward, the reader is stopped. When an error notch or perforation is reached the sensor 404 rises and moves the switch 418 to off position, thus stopping the reader. This stops instantly because of the effect of the half revolution clutch which drives the reader. When regenertaing a message the printer perforator also stops because it no longer receives a signal from the reader.

It is believed that the construction and operation of my improved tape reader and test signal generator, with associated printer and perforator and error marker, as well as the advantages thereof will be apparent from the foregoing detailed description. It will also be apparent that while I have shown and described the apparatus in a preferred form, changes may be made without departing from the scope of the invention, as sought to be defined in the following claims. In the specification and claims the reference to incoming or outgoing telegraph line is not intended to exclude other types of signal channel, typically a radio telegraph channel. Reference in some claims to permitting movement of all sensor plates refers to the character reading sensors rather than the error sensors, one or the other of which may be blocked, according to tape width.

I claim:

1. A reader for reading code-perforated tape, said reader comprising a row of sensor plates each with a sensor pin, springs urging said plates toward the tape, aligned holes in said plates, a rod passing through said holes, a control knob at one end of the rod for moving said rod to one or another of a plurality of different positions, said rod being so shaped as to provide lockout cams at said holes such that in one position of the rod all of the plates are free to move toward the tape, and in another position of the rod all of the plates are blocked against movement toward the tape.

2. A reader for reading code-perforated tape, said reader comprising a row of closely adjacent sensor plates each with a sensor pin, pull springs urging said plates toward the tape, aligned holes in said plates, a rotatable rod passing through said holes, a control knob at one end of the rod for turning the same to one or another of different rotative positions, detent means to hold said rod in desired rotative position, said rod being so shaped in cross section at said holes as to provide lockout cams such that in one position of the rod at least some of the plates are free to move toward the tape, and in another position of the rod the plates are blocked against movement toward the tape.

3. A reader for reading code-perforated tape, said reader comprising a row of sensor plates each with a sensor pin, springs urging said plates toward the tape, aligned holes in said plates, a rod passing through said holes, said rod being so shaped as to provide lockout cams at said holes such that in one axial position it blocks some plates and permits movement of other plates, and in another axial position it blocks the latter plates and permits movement of the former plates, and means to reciprocate the rod axially between the said two axial positions, whereby the reader may be used to generate a two letter test signal without using tape in the reader.

4. A reader for reading code-perforated tape, said reader comprising a row of five sensor plates each with a sensor pin, springs urging said plates toward the tape, aligned holes in said plates, a rod passing through said holes, said rod being so shaped as to provide lockout cams at said holes such that in one axial position it blocks plates 1, 3 and 5 and permits movement of plates 2 and 4, and in another axial position it blocks plates 2 and 4 and permits movement of plates 1, 3 and 5, and means to reciprocate the rod axially between the said two axial positions, whereby the reader may be used to generate a two letter test signal without using tape in the reader.

5. A reader for reading code-perforated tape, said reader comprising a row of five closely adjacent sensor plates each with a sensor pin, springs urging said plates toward the tape, aligned holes in said plates, a rotatable and axially movable rod passing through said holes, a control knob at the end of said rod for turning the same to one or another of different rotative positions, detent means for holding the rod in desired rotative position, said rod being so shaped as to provide lockout cams at said holes such that in one rotative and axial position it blocks plates 1, 3 and 5 and permits movement of plates 2 and 4, and in the same rotative position but in another axial position it blocks plates 2 and 4 and permits movement of plates 1, 3 and 5, and cam and linkage means to reciprocate the rod axially between the said two axial positions, whereby the reader may be used to generate a two letter test signal without using tape in the reader.

6. A reader for reading code-perforated tape, said reader comprising a row of sensor plates each with a sensor pin, springs urging said plates toward the tape, aligned holes through said plates, a rod passing through said holes, said rod being movable rotatably and axially, means for rotating the rod, means to reciprocate the rod axially, said rod being so shaped as to provide lockout cams at said holes such that in different rotative positions it permits different plates to move, and in different axial positions it permits different plates to move.

7. A reader for reading code-perforated tape, said reader comprising a row of sensor plates each with a sensor pin, springs urging said plates toward the tape, aligned holes through said plates, a rod passing through said holes, said rod being movable rotatably and axially, a control knob at one end of said rod for rotating the same, to one or another of different rotative positions, cam and linkage means to reciprocate the rod axially when in one rotative position, it blocks all of the plates against movement, and in a third rotative position it is connected for axial reciprocation and is so shaped that when said third rotative position and in one axial position it blocks some plates and permits movement of other plates, and in another axial position it blocks the latter plates and permits movement of the former plates, whereby the reader may be used to generate a test signal without using tape.

8. A reader for reading code-perforated tape, said reader comprising a row of sensor plates each with a sensor pin, springs urging said plates toward the tape, aligned holes through said plates, a rod passing through said holes, said rod being movable rotatably and axially, a control knob at one end of said rod for rotating the same to one or another of different rotative positions, cam and linkage means to reciprocate the rod axially, said rod being so shaped as to provide lockout cams at said holes such that in one rotative position it permits all of the plates to move, in another rotative position it blocks all of the plates against movement, and in a third rotative position combined with one axial position it blocks plates 1, 3 and 5 and permits movement of plates 2 and 4, and in said third rotative position combined with another axial position it blocks plates 2 and 4 and permits movement of plates 1, 3 and 5, whereby the reader may be used to generate a test signal including blanks, dots and the letters RY, without requiring tape in the reader.

9. A reader for reading code-perforated tape, said reader comprising a row of closely adjacent sensor plates each with a sensor pin, springs urging said plates toward the tape, aligned holes through said plates, a rod passing through said holes, said rod being movable rotatably and axially, a control knob at one end of said rod for rotating the same to one or another of different rotative positions, detent means for holding the rod in desired rotative position, cam and linkage means to reciprocate the rod axially when in one rotative position but not in others, said rod being so shaped as to provide lockout cams at said holes such that in one rotative position it permits all of the plates to move, in another rotative position it blocks all of the plates against movement, and in a third rotative position it is connected for axial reciprocation and is so shaped that when in said third rotative position and in one axial position it blocks plates 1, 3 and 5, and permits movement of plates 2 and 4, and in another axial position it blocks plates 2 and 4, and permits movement of plates 1, 3 and 5, so as to generate an "RY" test signal without requiring tape in the reader.

10. A reader for reading coded tape, said reader comprising a feed roller, a forward facing ratchet feed wheel, a rearward facing ratchet feed wheel, motor driven feed mechanism to normally operate the forward feed wheel, a single manually operable lever, pawls cooperating with said ratchet wheels, and linkage connecting the same to the lever, whereby movement of the lever in one direction operates the rearward facing ratchet feed wheel and back spaces the tape, and movement in the other direction operates the forward facing ratchet feed wheel and forward spaces the tape, and additional linkage operated by movement of the lever in a third direction to so disable the feed mechanism as to afford free tape pull.

11. A reader for reading coded tape, said reader comprising a feed roller, a forward facing ratchet feed wheel, a rearward facing ratchet feed wheel, motor driven feed mechanism to normally operate the forward feed wheel, a single manually operable lever, pawls cooperating with said ratchet wheels, and linkage connecting the same to the lever, whereby movement of the lever in one direction operates the rearward facing ratchet feed wheel and back spaces the tape, and movement in the other direction operates the forward facing ratchet feed wheel and forward spaces the tape.

12. A reader for reading coded tape, said reader comprising a feed roller having a forward facing ratchet feed wheel and a rearward facing ratchet feed wheel, motor driven feed mechanism to normally operate the forward feed wheel, a single manually operable lever, pawls cooperating with said ratchet wheels, linkage connecting the pawls to the lever, whereby movement of the lever in one direction operates the rearward facing ratchet feed wheel and back spaces the tape, and movement in the other direction operates the forward facing ratchet feed wheel and forward spaces the tape, a detent wheel, and a detent roller resiliently urged against said wheel, and additional linkage operated by movement of the lever in a third direction which is in the direction of the longitudinal axis of the lever to so disable the feed mechanism and detent mechanism as to afford free tape pull.

13. A reader for reading coded tape, said reader comprising a feed roller having a forward facing ratchet feed wheel and a rearward facing ratchet feed wheel, motor driven feed mechanism to normally operate the forward feed wheel, a single manually operable lever, pawls cooperating with said ratchet wheels, linkage connecting the pawls to the lever, whereby movement of the lever in one direction operates the rearward facing ratchet feed wheel and back spaces the tape, and movement in the other direction operates the forward facing ratchet feed wheel and forward spaces the tape, a detent wheel, and a detent roller resiliently urged against said wheel.

14. A reader for reading code-perforated tape, said reader comprising a row of closely adjacent sensor plates each with a sensor pin, springs urging said plates toward the tape, a sprocket feed roller having a forward facing ratchet feed wheel and a rearward facing ratchet feed wheel, motor driven feed mechanism to normally operate the forward feed wheel, a single manually operable lever, pawls cooperating with said ratchet wheels, linkage connecting the pawls to the lever, whereby movement of the lever in one generally horizontal direction operates the rearward facing ratchet feed wheel and back spaces the tape, and movement in the other generally horizontal direction operates the forward facing ratchet feed wheel and forward spaces the tape, and additional linkage operated by downward movement of the lever to so disable the aforesaid mechanism as to afford free tape pull.

15. A reader for reading code-perforated tape, said reader comprising a row of closely adjacent sensor plates each with a sensor pin, springs urging said plates toward the tape, a sprocket feed roller having a forward facing ratchet and feed wheel and a rearward facing ratchet feed wheel, motor driven feed mechanism to normally operate the forward feed wheel, a single manually operable lever, pawls cooperating with said ratchet wheels, linkage connecting the pawls to the lever, whereby movement of the lever in one direction operates the rearward facing ratchet feed wheel and back spaces the tape, and movement in the other direction operates the forward facing ratchet feed wheel and forward spaces the tape.

16. A reader for reading code-perforated tape, said reader comprising a row of closely adjacent sensor plates each with a sensor pin, pull springs urging said plates toward the tape, two superposed sets of electrically insulated collateral contacts for each plate, each set comprising two stationary contacts with a movable contact therebetween, the ends of said movable contacts being operatively connected to a sensor plate for simultaneous movement thereby, whereby a plurality of independent circuits may be controlled by a sensor plate.

17. A reader for reading code-perforated tape, said reader comprising a row of sensor plates each with a sensor pin, springs urging said plates toward the tape, a retractor bar holding all of said plates away from the tape, motor operated means to reciprocate said bar to simultaneously release the plates, and additional motor operated lockout means to so selectively control the simultaneous rise of different groups of said plates as to generate a multiple letter test signal without requiring the use of tape in the reader.

18. A reader for reading code-perforated tape, said reader comprising a row of sensor plates each with a sensor pin, springs urging said plates toward the tape, a retractor bar holding all of said plates away from the tape, motor operated means to reciprocate said bar to simultaneously release the plates, and additional motor operated lockout means to so selectively control the simultaneous rise of two different groups of said plates as to generate an RY test signal without requiring the use of tape in the reader, one group of plates released by the lockout means corresponding to the letter "R" and the other group of plates released by the lockout means corresponding to the letter "Y."

19. A reader for reading code-perforated tape, said reader comprising a row of sensor plates each with a sensor pin, two of said plates being for error detection in a narrow or a wide tape respectively, springs urging said plates toward the tape, aligned holes in said plates, a rod passing through said holes, a control knob at one end of the rod for moving said rod to one or another of a plurality of different positions, said rod being so shaped as to provide lockout cams at said holes such that in one position of the rod all of the plates except one error plate are free to move toward the tape, and in another position of the rod all of the plates except the other error plate are free to move toward the tape.

20. A reader for reading code-perforated tape, said reader comprising a row of sensor plates each with a sensor pin, two of said plates being for error detection in a narrow or a wide tape respectively, springs urging said plates toward the tape, aligned holes in said plates, a rotatable rod passing through said holes, a control knob at one end of the rod for turning the same to one or another of different rotative positions, said rod being so shaped in cross section at said holes as to provide lockout cams such that in one position of the rod all of the plates except one error plate are free to move toward the tape, and in another position of the rod all of the plates except the other error plate are free to move toward the tape, and in a third position of the rod all of the plates are blocked against movement toward the tape.

21. A reader as defined in claim 20 in which there is a fourth rotative position in which the rod also has two axial positions, and in which the rod is so shaped that in one axial position it blocks plates 1, 3 and 5, and permits movement of plates 2 and 4, and in another axial position it blocks plates 2 and 4 and permits movement of plates 1, 3 and 5, and in which there is a cam and linkage means to reciprocate the rod axially between the said two axial positions, whereby the reader may generate a two letter test signal without requiring tape in the reader.

22. A reader for reading code-perforated tape, said reader comprising a row of sensor plates each with a sensor pin, springs urging said plates toward the tape, one of said plates being an extra error sensor for response to a special error perforation, an over-the-center electrical switch for making the reader operative or inoperative, and means so connecting said error sensor to the switch that movement toward the tape because of an error perforation moves the switch from operative to inoperative position.

23. A reader for reading code-perforated tape, said reader comprising a row of sensor plates each with a sensor pin, springs urging said plates toward the tape, one of said plates being an extra error sensor for response to a special error perforation, an over-the-center electrical switch for making the reader operative or inoperative, a manually operable handle for moving said switch to either position, and means so connecting said error sensor to the same switch that movement toward the tape because of an error perforation moves the switch from operative to inoperative position.

References Cited by the Examiner

UNITED STATES PATENTS

| | | | |
|---|---|---|---|
| 1,941,916 | 1/1934 | Rothermel | 178—17 |
| 2,167,532 | 7/1939 | Sims | 178—17 |
| 2,371,367 | 3/1945 | Warburton | 178—17 |
| 2,389,200 | 11/1945 | Lake | 178—42 |
| 2,751,432 | 6/1956 | Breuer | 178—17 |
| 3,013,118 | 12/1961 | Kleinschmidt | 178—17 |
| 3,014,092 | 12/1961 | DeBoo | 178—17 |
| 3,022,376 | 2/1962 | Howard | 178—81 |

FOREIGN PATENTS

| | | |
|---|---|---|
| 580,563 | 9/1933 | Germany. |

NEIL C. READ, *Primary Examiner.*

ROBERT H. ROSE, *Examiner.*

THOMAS B. HABECKER, A. J. DUNN, T. A. ROBINSON, *Assistant Examiners.*